United States Patent
Yang et al.

(10) Patent No.: US 8,094,468 B2
(45) Date of Patent: Jan. 10, 2012

(54) CONTROL CIRCUIT HAVING OFF-TIME MODULATION TO OPERATE POWER CONVERTER AT QUASI-RESONANCE AND IN CONTINUOUS CURRENT MODE

(75) Inventors: Ta-Yung Yang, Milpitas, CA (US); Chuh-Ching Li, Taoyuan County (TW); Ying-Chieh Su, Taipei County (TW); Chih-Chi Chang, Taoyuan County (TW)

(73) Assignee: System General Corp., Taipei Hsien (TW)

( * ) Notice: Subject to any disclaimer, the term of this patent is extended or adjusted under 35 U.S.C. 154(b) by 719 days.

(21) Appl. No.: 12/255,636

(22) Filed: Oct. 21, 2008

(65) Prior Publication Data
US 2010/0097104 A1    Apr. 22, 2010

(51) Int. Cl.
*H02M 3/335* (2006.01)
*H02M 1/00* (2007.01)

(52) U.S. Cl. .................. 363/21.18; 363/21.1; 363/21.01; 363/78

(58) Field of Classification Search .............. 363/21.12, 363/21.13, 21.16, 21.17, 21.18, 21.04, 21.05, 363/21.08, 21.1, 15, 16, 20, 21.01, 78, 95, 363/97
See application file for complete search history.

(56) References Cited

U.S. PATENT DOCUMENTS

| | | | | |
|---|---|---|---|---|
| 2005/0146903 A1* | 7/2005 | Yang et al. | .................. | 363/21.15 |
| 2005/0219871 A1* | 10/2005 | Li et al. | .................. | 363/21.1 |
| 2006/0055433 A1* | 3/2006 | Yang et al. | .................. | 327/10 |
| 2007/0109816 A1* | 5/2007 | Yang | .................. | 363/16 |
| 2007/0109821 A1* | 5/2007 | Yang | .................. | 363/21.04 |
| 2007/0121352 A1* | 5/2007 | Yang et al. | .................. | 363/21.15 |

* cited by examiner

*Primary Examiner* — Adolf Berhane
*Assistant Examiner* — Jeffrey Gblende
(74) *Attorney, Agent, or Firm* — Jianq Chyun IP Office

(57) ABSTRACT

A control circuit is developed to adaptively operate a power converter at quasi-resonance (QR) and in a continuous current mode (CCM) to achieve high efficiency. The control circuit includes a PWM circuit generating a switching signal coupled to switch a transformer. A signal generation circuit generates a ramp signal and a pulse signal. The pulse signal is generated in response to the ramp signal for switching on the switching signal. A feedback circuit produces a feedback signal according to an output load of the power converter. The feedback signal is coupled to switch off the switching signal. A detection circuit is coupled to the transformer for generating a valley signal in response to the waveform of the transformer. The valley signal is further coupled to generate the pulse signal when the ramp signal is lower than a threshold. The level of the threshold is correlated to the feedback signal.

14 Claims, 6 Drawing Sheets

CONTROL CIRCUIT HAVING OFF-TIME MODULATION TO OPERATE POWER CONVERTER AT QUASI-RESONANCE AND IN CONTINUOUS CURRENT MODE

BACKGROUND OF THE INVENTION

1. Field of the Invention

The present invention relates to a power converter, and more specifically relates to a control circuit of a switching power converter.

2. Description of Related Art

Flyback power converters have been widely used to provide power supplies for electronic products, such as home appliances, computers, etc. For achieving high efficiency and reducing power loss, the power converters are normally developed to be operated in a continuous current mode (CCM) to reduce the conduction loss, particularly for being operated at a low input voltage and a high output current. However, when the power converters are operated at a high input voltage, quasi-resonance (QR) is preferred for reducing switching losses and EMI. The present invention is thus directed to a control circuit to adaptively operate the power converter at QR and in the CCM to achieve high efficiency. The detailed technologies of the flyback power converters can be found in textbooks, such as "Switchmode Power Supply Handbook" authored by Keith H. Billings and published by McGraw-Hill Book Co. on December 1989, and "Switching Power Supply Design" authored by Abraham I. Pressman and published by McGraw-Hill Book Co. on December 1991.

SUMMARY OF THE INVENTION

The present invention is directed to a control circuit to adaptively operate a power converter at quasi-resonance and in a continuous current mode for achieving high efficiency. The control circuit includes a PWM circuit generating a switching signal coupled to switch a transformer of the power converter. A signal generation circuit is coupled to an input of the power converter to receive an input signal for generating a ramp signal and a pulse signal. The frequency of the ramp signal is decreased in response to an increase of the input signal. The level of the input signal is correlated to the input voltage of the power converter. The pulse signal is utilized to turn on the switching signal.

A feedback circuit is coupled to an output of the power converter for generating a feedback signal. The feedback signal is used for turning off the switching signal. A detection circuit is connected to the transformer for generating a valley signal in response to the waveform of the transformer. The pulse signal is generated in response to the ramp signal and the valley signal. Furthermore, a threshold generation circuit of the signal generation circuit generates a threshold in accordance with the level the feedback signal. The threshold is compared with the ramp signal producing a trigger signal. The valley signal is allowed to turn on the pulse signal when the trigger signal is enabled.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DESCRIPTION OF THE PREFERRED EMBODIMENTS

Figure 1:
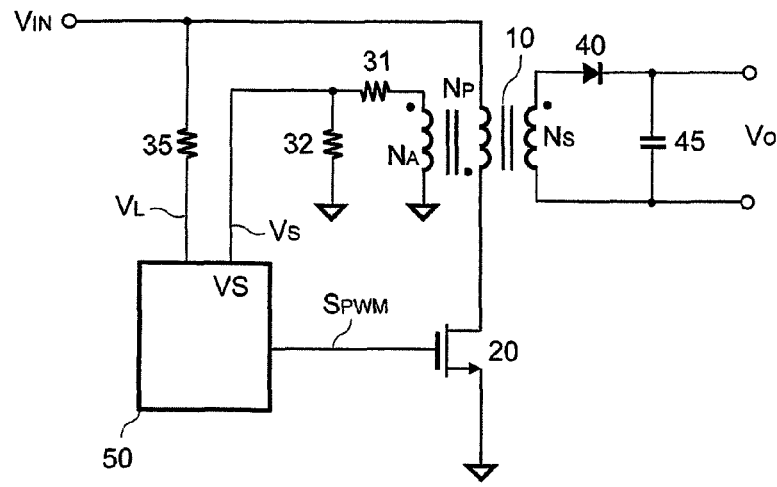
FIG. 1 shows a schematic diagram of a power converter.

FIG. 1 shows a switching power converter. A transformer 10 has an auxiliary winding $N_A$, a primary winding $N_P$, and a secondary winding $N_S$. The primary winding $N_P$ is coupled to an input voltage $V_{IN}$. The secondary winding $N_S$ generates an output voltage $V_O$ via a rectifier 40 and a capacitor 45. In order to regulate the output voltage $V_O$, a control circuit 50 generates a switching signal $S_{PWM}$ to switch the transformer 10 via a transistor 20. When the transistor 20 is turned on, the input voltage $V_{IN}$ is applied to magnetize the transformer 10. A magnetizing current is therefore flowed through the primary winding $N_P$ of the transformer 10 and the transistor 20. Once the switching signal $S_{PWM}$ is disabled and the transistor 20 is turned off, demagnetization of the transformer 10 is started. Energy stored into the transformer 10 is delivered to the secondary winding $N_S$ and the auxiliary winding $N_A$. Therefore, the enabling of the switching signal $S_{PWM}$ represents the magnetization of the transformer 10. The disabling of the switching signal $S_{PWM}$ represents the start of the demagnetization of the transformer 10. If a forward voltage of the rectifier 40 can be neglected, a reflected voltage $V_{AUX}$ of the auxiliary winding $N_A$ can be expressed as follows, $$V_{AUX} = \frac{N_A}{N_S} \times V_O \qquad (1)$$

, where $N_A$ and $N_S$ are respectively the winding turns of the auxiliary winding $N_A$ and the secondary winding $N_S$ of the transformer 10.

A voltage divider formed by resistors 31 and 32 is connected to a VS terminal of the control circuit 50 to detect the waveform and the reflected voltage $V_{AUX}$ of the auxiliary winding $N_A$ of the transformer 10. The voltage $V_S$ detected at the VS terminal of the control circuit 50 can be shown as follows, $$V_S = \frac{R_{32}}{R_{31} + R_{32}} \times V_{AUX} \qquad (2)$$

, where $R_{31}$ and $R_{32}$ are respectively resistances of the resistors 31 and 32.

In order to precisely detect the output voltage $V_O$ of the power converter, the reflected voltage should be sampled when the switching current of the secondary winding $N_S$ is about to reach zero. Therefore, the variation of the forward voltage of the rectifier 40 can be neglected. Furthermore, a resistor 35 is connected from the input voltage $V_{IN}$ to the control circuit 50 for the start-up operation and the input voltage detection.

Figure 2:
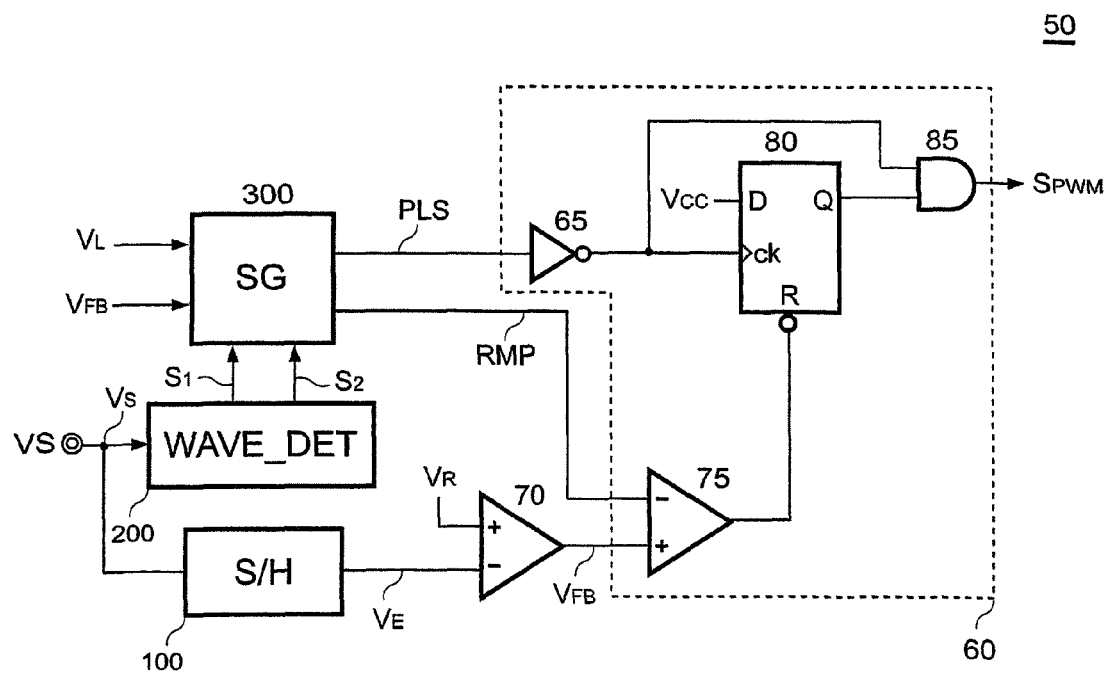
FIG. 2 shows a control circuit of the power converter in accordance with the present invention.

FIG. 2 shows an embodiment of the control circuit 50 of the invention. It includes a $_{PWM}$ circuit 60 generating a switching signal $S_{PWM}$ coupled to switch the transformer 10 of FIG. 1. A flip-flop 80, an AND gate 85, an inverter 65, and a comparator 75 develop the PWM circuit 60. A signal generation circuit (SG) 300 is coupled to receive an input signal $V_L$ and a feedback signal $V_{FB}$ for generating a ramp signal RMP and a pulse signal PLS. The pulse signal PLS is coupled to turn on the switching signal $S_{PWM}$ by clocking the flip-flop 80 through the inverter 65. The output of the flip-flip 80 is connected to the AND gate 85 for generating the switching signal $S_{PWM}$. Another input of the AND gate 85 is coupled to the pulse signal PLS through the inverter 65. Therefore, the switching signal $S_{PWM}$ is off in response to the enabling of the pulse signal PLS. A feedback circuit includes a sample-hold (S/H) circuit 100 and an error amplifier 70. The sample-hold circuit 100 is coupled to the VS terminal to generate a sense signal $V_E$ in accordance with the reflected voltage of the transformer 10. The sense signal $V_E$ is coupled to an error amplifier 70. The error amplifier 70 includes a reference voltage $V_R$ for generating the feedback signal $V_{FB}$. The level of the sense signal $V_E$ is correlated to the output voltage $V_O$ of the power converter. The level of the feedback signal $V_{FB}$ is correlated to an output load of the power converter.

The feedback signal $V_{FB}$ is further coupled to turn off the switching signal $S_{PWM}$ through the comparison of the feedback signal $V_{FB}$ with the ramp signal RMP at the comparator 75. The output of the comparator 75 generates an off signal coupled to reset the flip-flop 80.

A detection circuit (WAVE_DET) 200 is coupled to the transformer 10 through the VS terminal for generating a valley signal $S_2$ in response to the waveform of the transformer 10. The pulse signal PLS is generated in response to the ramp signal RMP and the valley signal $S_2$. The frequency of the ramp signal RMP is decreased in response to an increase of the input signal $V_L$. The level of the input signal $V_L$ is correlated to the input voltage $V_{IN}$ of the power converter.

Figure 3:
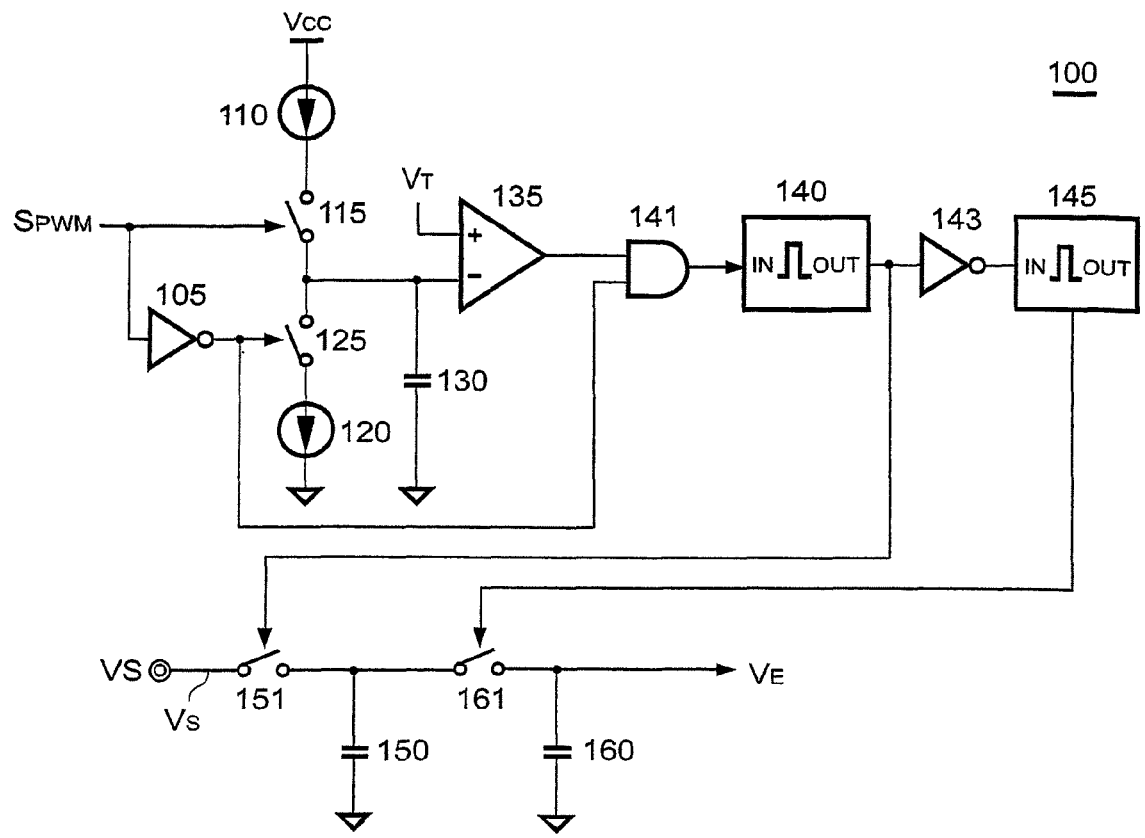
FIG. 3 shows an embodiment of a sample-hold circuit according to the present invention.

FIG. 3 shows an embodiment of the sample-hold circuit 100 of the invention. A switch 151 is coupled to sample the reflected voltage of the transformer 10 through the terminal VS. The sampled signal will be stored in the capacitor 150. After the sampling of the switch 151, the signal stored in the capacitor 150 will be further sampled into a capacitor 160 via a switch 161. The sense signal $V_E$ is generated in the capacitor 160. One-shot circuits 140 and 145 generate a first sampling signal and a second sampling signal coupled to control the switches 151 and 161, respectively. The reflected voltage can be accurately sampled and related to the output voltage $V_O$ if the sampling is done when the transformer 10 is fully demagnetized. The magnetized flux $\Phi_C$ of the transformer 10 is equal to the demagnetized flux $\Phi_D$. The equality can be shown as follows, $$\Phi_C = \Phi_D \quad (3)$$

$$\Phi = B \times Ae = \frac{V \times T}{N} \quad (4)$$

$$\frac{V_{IN}}{N_P} \times T_{CHARGE} = \frac{V_O}{N_S} \times T_{DISCHARGE} \quad (5)$$

$$T_{DISCHARGE} = \frac{N_P}{N_S} \times \frac{V_{IN}}{V_O} \times T_{CHARGE} \quad (6)$$

, where B is the flux density; Ae is the cross-sectional area of the transformer; T is the magnetized time or the demagnetized time of the transformer; N is the winding turns of the transformer.

The demagnetized time $T_{DISCHARGE}$ of the transformer 10 can be obtained in accordance with the equation (6). It shows the demagnetized time $T_{DISCHARGE}$ can be predicted in accordance with the magnetized voltage $V_{IN}$, the demagnetized voltage $V_O$ and the magnetized time $T_{CHARGE}$. The magnetized time $T_{CHARGE}$ corresponds to the enabling time of the switching signal $S_{PWM}$.

A capacitor 130 is utilized to determine the period of the sampling. A switch 115 is coupled between the current source 110 and the capacitor 130. A switch 125 is coupled between the current source 120 and the capacitor 130. A comparator 135 is coupled to the capacitor 130 to generate a first-control signal at an output of the comparator 135 once the voltage of the capacitor 130 is lower than a threshold $V_T$. The switch 115 is controlled by the switching signal $S_{PWM}$. The switch 125 is also controlled by the switching signal $S_{PWM}$ via an inverter 105. An output of the inverter 105 and the first-control signal are respectively connected to two inputs of an AND gate 141. An output of the AND gate 141 is connected to drive a one-shot circuit 140 to control the switch 151 for generating the first sampling signal. An output of the one-shot circuit 140 is connected to another one-shot circuit 145 via an inverter 143 to control the switch 161 for generating the second sampling signal. The current of the current source 110 is related to the input voltage $V_{IN}$ of the power converter. The current of the current source 120 is correlated to the output voltage $V_O$ of the power converter.

Figure 4:
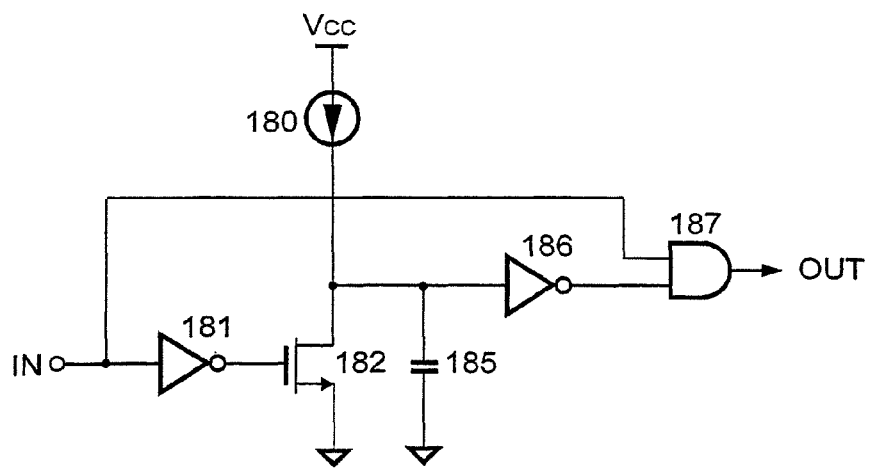
FIG. 4 shows a schematic circuit of a one-shot circuit.

FIG. 4 shows an embodiment of the schematic circuit of the one-shot circuit of the invention. An input signal IN is coupled to control a transistor 182 through an inverter 181. The transistor 182 is used for discharging a capacitor 185. A current source 180 is connected to charge the capacitor 185. The capacitor 185 is coupled to an AND gate 187 via an inverter 186. Another input of the AND gate 187 is the input signal IN. An output of the AND gate 187 generates an output signal OUT. Therefore, the output signal OUT is generated in response to the enabling of the input signal IN. The pulse width of the output signal OUT is determined by the current of the current source 180 and the capacitance of the capacitor 185.

Figure 5:
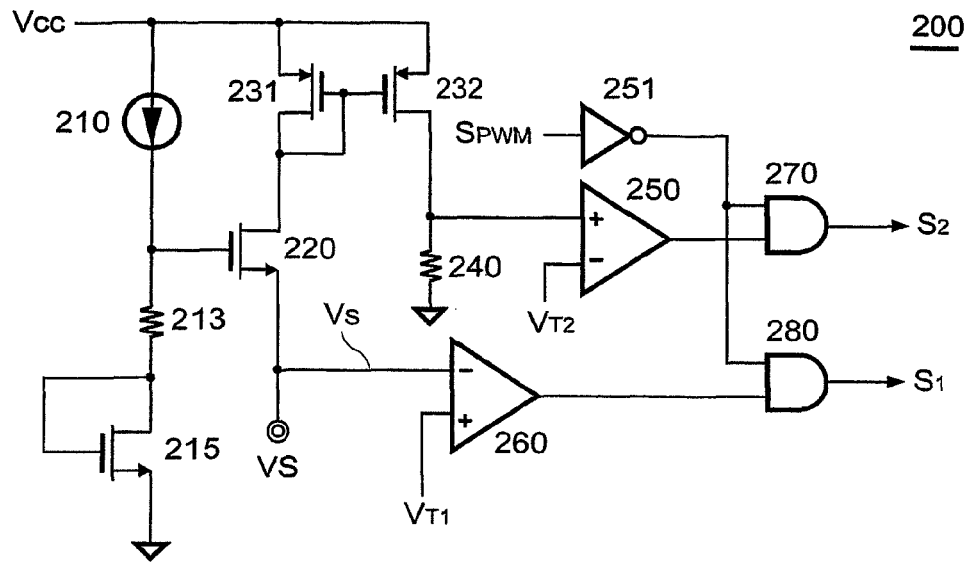
FIG. 5 shows a detection circuit according to an embodiment of the present invention.

FIG. 5 shows an embodiment of the detection circuit 200. The detection terminal VS is coupled to the transformer 10 to detect the waveform of the transformer 10. A voltage clamp circuit is developed to clamp a minimum voltage at the detection terminal VS. A current source 210, a resistor 213, and transistors 215 and 220 form the voltage clamp circuit. The threshold voltage of the transistor 215 is correlated to the threshold voltage of the transistor 220. The current of the current source 210 and the resistance of the resistor 213 determine the minimum voltage at the detection terminal VS. A current detection circuit generates a current signal in response to the current sourced to the detection terminal VS. Transistors 231 and 232 and a resistor 240 develop the current detection circuit for generating the current signal at the resistor 240. A comparator 250 generates the valley signal $S_2$ in response to this current signal. When this current signal is higher than a threshold signal $V_{T2}$, the comparator 250 will output a signal coupled to an AND gate 270. Another input of the AND gate 270 is coupled to the switching signal $S_{PWM}$ via an inverter 251. Therefore, the valley signal $S_2$ is generated only when the switching signal $S_{PWM}$ is off An input of another comparator 260 is also coupled to the detection terminal VS. When the switching signal $S_{PWM}$ is off and the voltage of the detection terminal VS is lower than a threshold $V_{T1}$, an AND gate 280 will output a start signal $S_1$.

Figure 6:
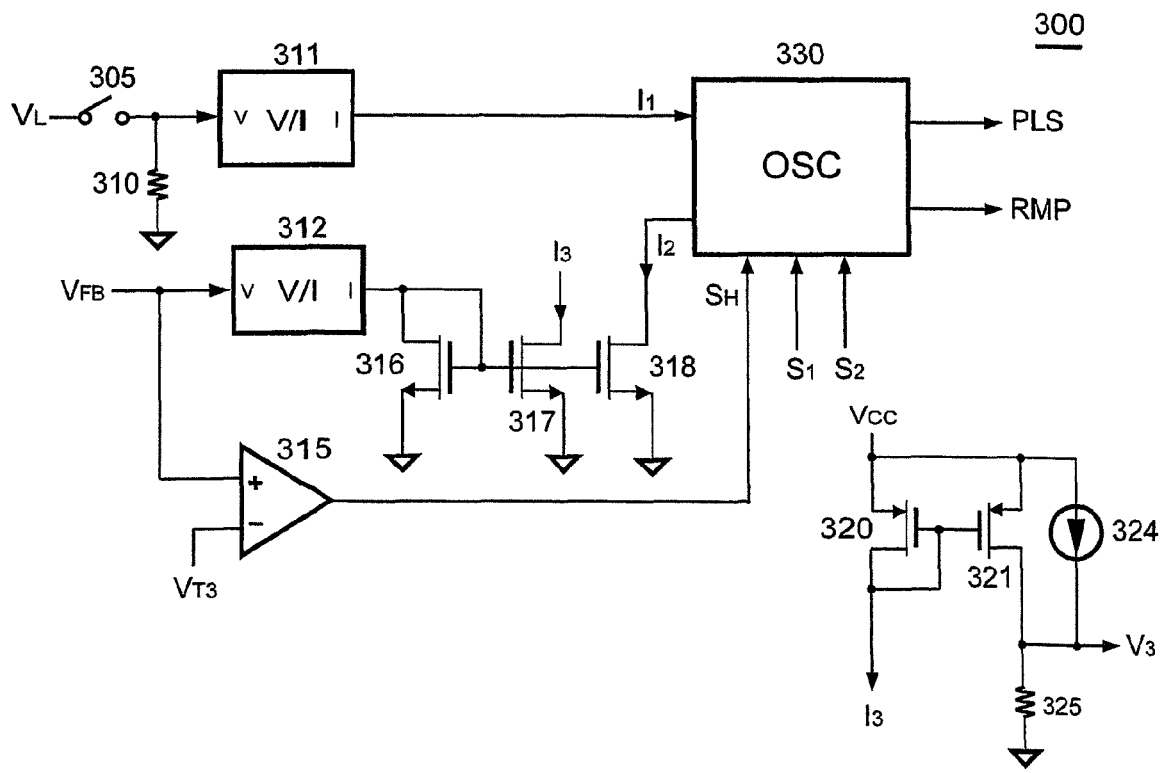
FIG. 6 shows a signal generation circuit according to an embodiment of the present invention.

FIG. 6 is an embodiment of the schematic circuit of the signal generation circuit 300. The input signal $V_L$ is coupled to a resistor 310 through a switch 305. A V-to-I converter (V/I) 311 generates a current signal $I_1$ in response to the input signal $V_L$. Another V-to-I converter (V/I) 312 and a current-mirror circuit generate a current signal $I_2$ and a current signal $I_3$ in accordance with the feedback signal $V_{FB}$. Transistors 316, 317 and 318 form the current-mirror circuit. An oscillation circuit (OSC) 330 is coupled to receive the current signal $I_1$ and the current signal $I_2$ for generating the pulse signal PLS and the ramp signal RMP. The current signal $I_3$ is coupled to generate a threshold $V_3$. Transistors 320 and 321, a current source 324, and a resistor 325 develop a threshold generating circuit. The transistors 320 and 321 receive the current signal $I_3$ for generating the threshold $V_3$ at the resistor 325. The current source 324 is also connected to the resistor 325 to provide a minimum current for generating the threshold $V_3$. Therefore, the threshold $V_3$ is produced in accordance with the level of the feedback signal $V_{FB}$. The feedback signal $V_{FB}$ is further coupled to a comparator 315 to be compared with a threshold $V_{T3}$ for generating a high-load signal $S_H$ when the output load of the power converter is high.

Figure 7:
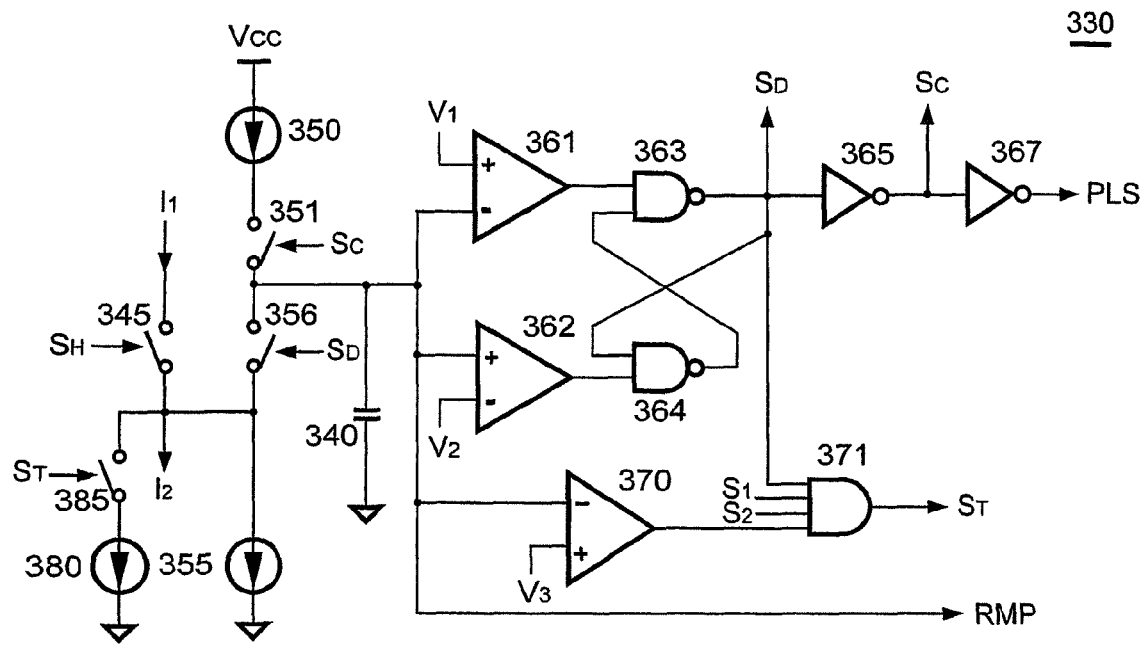
FIG. 7 shows an oscillation circuit according to an embodiment of the present invention.

FIG. 7 shows an embodiment of the oscillation circuit 330. A current source 350 is coupled to charge a capacitor 340 through a switch 351. A current source 355 is coupled to discharge the capacitor 340 via a switch 356. The switches 351 and 356 are controlled by control signals $S_C$ and $S_D$ respectively. A comparator 361 has a threshold $V_1$. A comparator 362 has a threshold $V_2$. The comparators 361 and 362 are connected to the capacitor 340 for generating signals connected to NAND gates 363 and 364. The NAND gate 363 generates the control signal $S_D$ for discharging the capacitor 340. The control signal $S_D$ is connected to an inverter 365 to generate the control signal $S_C$ for charging the capacitor 340. The control signal $S_C$ is further connected to an inverter 367 for generating the pulse signal PLS. The ramp signal RMP is produced on the capacitor 340. Because the pulse signal PLS is generated in the process of discharging the capacitor 340. The switching signal $S_{PWM}$ is off during a discharge time of the ramp signal RMP.

The threshold $V_3$ is coupled to a comparator 370 to be compared with the ramp signal RMP for generating a trigger signal $S_T$. An output of the comparator 370 is connected to an AND gate 371. The control signal $S_D$, the start signal $S_1$, and the valley signal $S_2$ are connected to the AND gate 371. The trigger signal $S_T$ is generated at an output of the AND gate 371. Switches 345 and 385 and the current signal $I_2$ are connected to the current source 355 in parallel for modulating the discharge current of the capacitor 340. The current $I_2$ is correlated to the feedback signal $V_{FB}$. The discharge current is thus decreased in response to a decrease of the feedback signal $V_{FB}$. Therefore, the discharge time of the ramp signal RMP is increased in response to the decrease of the feedback signal $V_{FB}$. An off time of the switching signal $S_{PWM}$ is increased in response to the decrease of the feedback signal $V_{FB}$.

The current signal $I_1$ is connected to the switch 345. The switch 345 is controlled by the high-load signal $S_H$. Because the current signal $I_1$ is correlated to the input voltage $V_{IN}$ of the power converter, the discharge current of the capacitor 340 is decreased in response to the increase of the input voltage $V_{IN}$ when the output load is high (the $S_H$ signal is enabled). A current 380 is connected to the switch 385. The switch 385 is controlled by a trigger signal $S_T$. Since the current of the current source 380 is high, the capacitor 340 will be immediately discharged once the trigger signal $S_T$ is on. Therefore, the valley signal $S_2$ is able to turn on the pulse signal PLS when the trigger signal $S_T$ is enabled.

Figure 8:
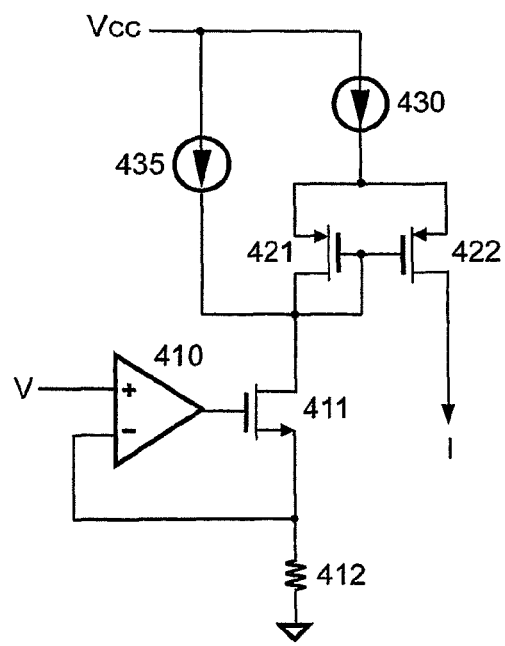
FIG. 8 schematically shows a V-to-I converter.

FIG. 8 schematically shows an embodiment of the V-to-I converters 311 and 312. The input voltage V is connected to the positive input of an operational amplifier 410. The negative input of the operational amplifier 410 is connected to a resistor 412. The output of the operational amplifier 410 is coupled to drive a transistor 411. The current of the transistor 411 will flow through the resistor 412. A current source 435 is coupled to the transistor 411. Once the current of the transistor 411 is higher than the current of the current source 435, a current ($I_{411}-I_{435}$) will flow through a current mirror that is developed by transistors 421 and 422. A maximum current of this current source is limited by a current source 430. The transistor 422 generates an output current I correlated to the input voltage V.

Figure 9:
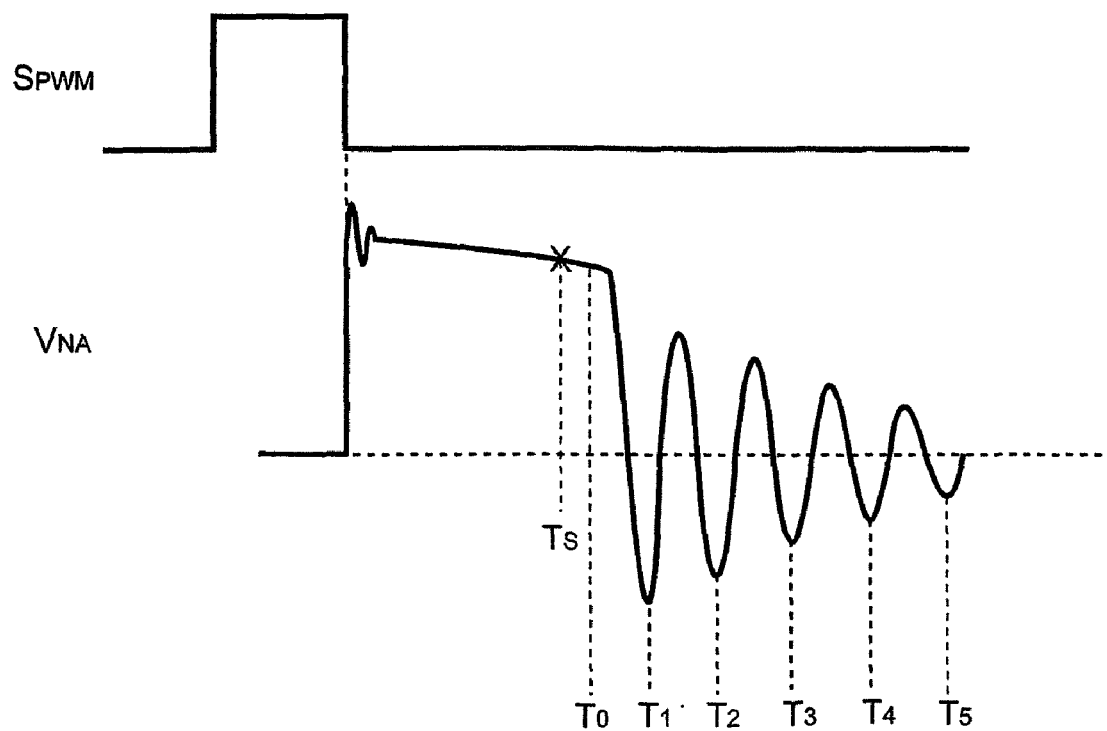
FIG. 9 shows a switching signal and a reflected voltage of a transformer.

FIG. 9 shows waveforms of the switching signal $S_{PWM}$ and the reflected voltage $V_{NA}$ of the transformer 10. The reflected voltage $V_{NA}$ is sampled through the detection terminal VS and the switch 151 (FIG. 3) for generating the sense signal $V_E$ at the period of $T_S$. For the heavy load condition and the continuous current mode (CCM) operation, the switching signal $S_{PWM}$ would be enabled at the period of $T_0$. For the QR operation, the switching signal $S_{PWM}$ would be turned on at the period of $T_1$, $T_2$, or $T_5$, depending on the load condition. If the load is heavy, then the turn-on time could be $T_1$ or $T_2$. If the load is light, then the turn-on time could be $T_3$, $T_4$, or $T_5$.

Figure 10A:
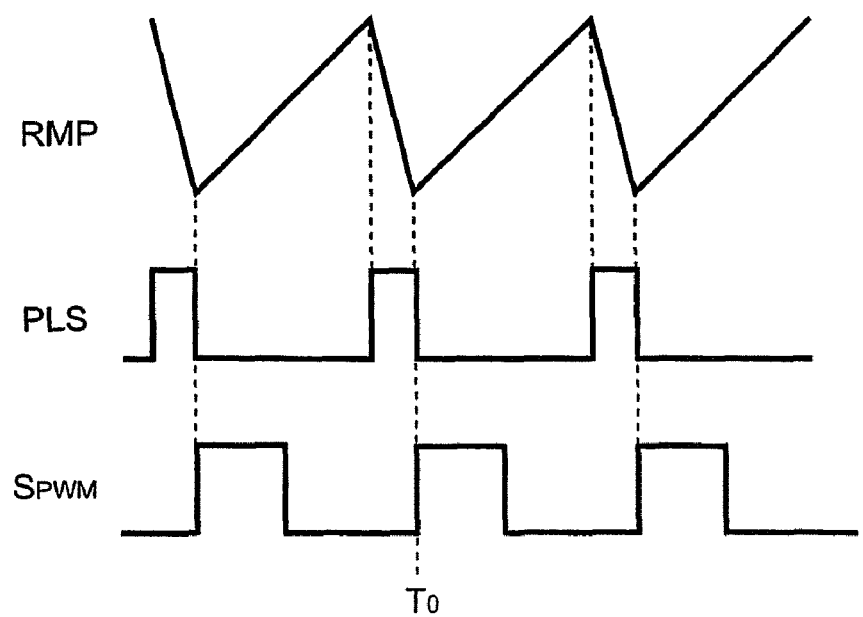
FIG. 10A shows key waveforms of the power converter operated in a CCM.
Figure 10B:
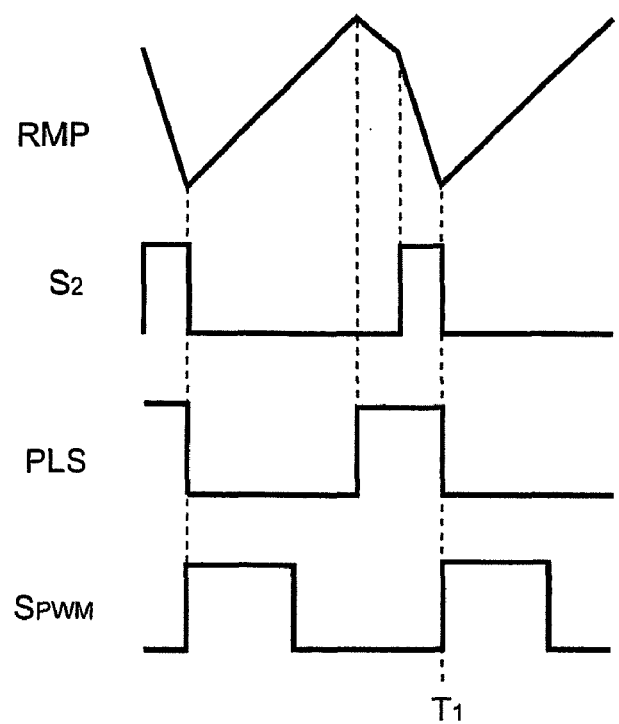
FIG. 10B shows key waveforms of the power converter operated at QR and heavy load.
Figure 10C:
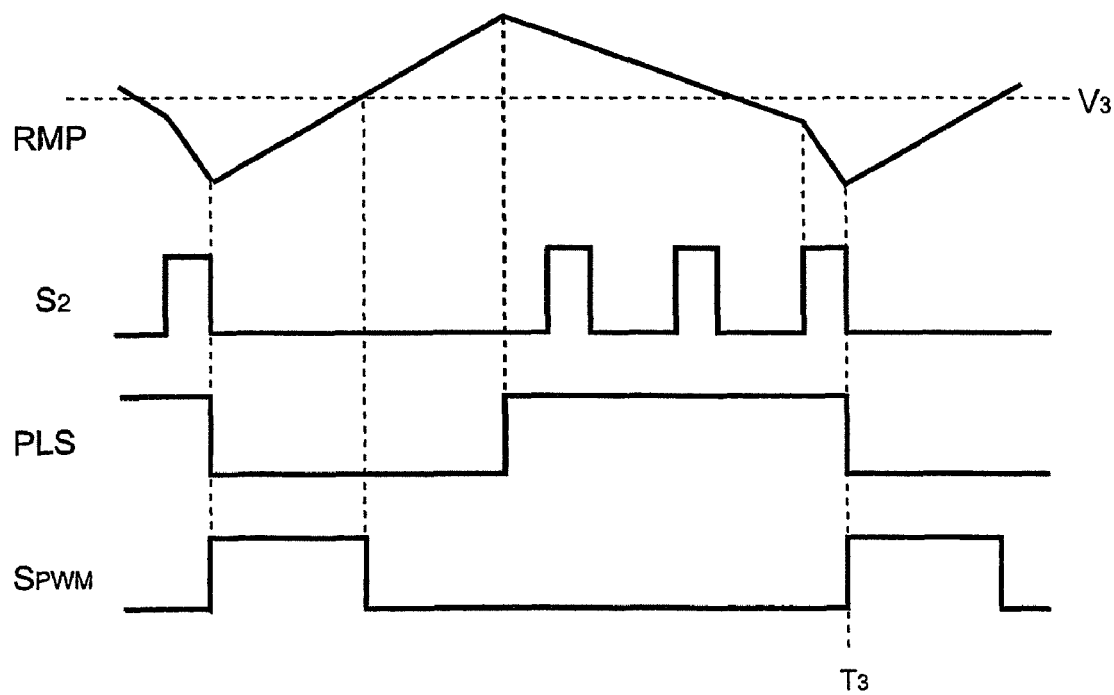
FIG. 10C shows key waveforms of the power converter operated at QR and light load.

FIG. 10A shows key waveforms of the power converter operated in the CCM. The switching signal $S_{PWM}$ is turned on at the period of $T_0$. FIG. 10B shows the power converter is operated at QR and with a heavy load. The switching signal $S_{PWM}$ is turned on at the period of $T_1$. FIG. 10C shows the power converter is operated at QR and with a light load. The switching signal $S_{PWM}$ is turned on at the period of $T_3$ as an example.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A control circuit for a power converter, the control circuit comprising:
   a PWM circuit, generating a switching signal coupled to switch a transformer of the power converter;
   a signal generation circuit, coupled to an input of the power converter to receive an input signal for generating a ramp signal and a pulse signal, the pulse signal being coupled to turn on the switching signal;
   a feedback circuit, coupled to an output of the power converter for generating a feedback signal; the feedback signal is coupled to turn off the switching signal; and
   a detection circuit, coupled to the transformer for generating a valley signal in response to the waveform of the transformer, wherein the pulse signal is generated in response to the ramp signal and the valley signal, the frequency of the ramp signal is decreased in response to an increase of the input signal, and the level of the input signal is correlated to an input voltage of the power converter.

2. The control circuit as claimed in claim 1, the signal generation circuit comprising;
a threshold generation circuit generating a threshold in accordance with the level of the feedback signal, the threshold being coupled to compare with the ramp signal for generating a trigger signal, wherein the valley signal is coupled to turn on the pulse signal when the trigger signal is enabled.

3. The control circuit as claimed in claim 1, wherein an off time of the switching signal is increased in response to a decrease of the feedback signal.

4. The control circuit as claimed in claim 1, wherein a discharge time of the ramp signal is increased in response to a decrease of the feedback signal, and the switching signal is off during the discharge time of the ramp signal.

5. The control circuit as claimed in claim 1, the feedback circuit comprising:
a sample-hold circuit, coupled to the transformer to produce a sense signal by sampling a reflected voltage of the transformer when the switching signal is off;
an error amplifier, coupled to receive the sense signal for generating the feedback signal, wherein the level of the sense signal is correlated to the output voltage of the power converter, and the level of the feedback signal is correlated to an output load of the power converter.

6. The control circuit as claimed in claim 1, the PWM circuit comprising:
a comparator, coupled to receive the feedback signal and the ramp signal for generating a reset signal;
a flip-flip, coupled to receive the pulse signal for turning on the switching signal, wherein the switching signal is switched off in response to the reset signal.

7. The control circuit as claimed in claim 1, the detection circuit comprising:
a detection terminal, coupled to the transformer to detect the waveform of the transformer;
a voltage clamp circuit, clamping a minimum voltage at the detection terminal;
a current detection circuit, generating a current signal in response to a current sourced to the detection terminal;
a comparator, generating the valley signal in response to the current signal, wherein the valley signal is generated only when the switching signal is off.

8. The control circuit as claimed in claim 2, the signal generation circuit further comprising:
a first V-to-I converter, generating a first current signal in response to the input voltage of the power converter;
a second V-to-I converter, generating a second current signal and a third current signal in accordance with the feedback signal;
an oscillation circuit, coupled to receive the first current signal and the second current signal for generating the pulse signal and the ramp signal, wherein the third current signal is coupled to generate the threshold.

9. A switching control circuit for a power converter, the switching control circuit comprising:
a PWM circuit, generating a switching signal coupled to switch a transformer of the power converter;
a signal generation circuit, generating a ramp signal and a pulse signal;
a feedback circuit, generating a feedback signal in accordance with an output load of the power converter;
a detection circuit, coupled to the transformer for generating a valley signal in response to the waveform of the transformer, wherein the feedback signal is coupled to switch off the switching signal, the pulse signal is generated in response to the ramp signal for switching on the switching signal, the valley signal is coupled to generate the pulse signal when the ramp signal is lower than a threshold, and the level of the threshold is correlated to the feedback signal.

10. The switching control circuit as claimed in claim 9, wherein an off time of the switching signal is increased in response to a decrease of the feedback signal.

11. The switching control circuit as claimed in claim 9, wherein a discharge time of the ramp signal is increased in response to a decrease of the feedback signal, the frequency of the ramp signal is decreased in response to an increase of the input signal, and the level of the input signal is correlated to an input voltage of the power converter.

12. The switching control circuit as claimed in claim 9, the feedback circuit comprising:
a sample-hold circuit, coupled to the transformer to produce a sense signal by sampling a reflected voltage of the transformer when the switching signal is off;
an error amplifier, coupled to receive the sense signal for generating the feedback signal, wherein the level of the sense signal is correlated to the output voltage of the power converter, and the level of the feedback signal is correlated to the output load of the power converter.

13. The switching control circuit as claimed in claim 9, the detection circuit comprising:
a detection terminal, coupled to the transformer to detect the waveform of the transformer;
a voltage clamp circuit, clamping a minimum voltage of the detection terminal;
a current detection circuit, generating a current signal in response to a current sourced to the detection terminal;
a comparator, generating the valley signal in response to the current signal, wherein the valley signal is generated only when the switching signal is off 14. The switching control circuit as claimed in claim 9, the signal generation circuit further comprising:
a first V-to-I converter, generating a first current signal in response to the input voltage of the power converter;
a second V-to-I converter, generating a second current signal and a third current signal in accordance with the feedback signal;
an oscillation circuit, coupled to receive the first current signal and the second current signal for generating the pulse signal and the ramp signal, wherein the third current signal is coupled to generate the threshold.

* * * * *